(12) United States Patent
Uchida

(10) Patent No.: US 12,165,810 B2
(45) Date of Patent: Dec. 10, 2024

(54) MULTILAYER CERAMIC CAPACITOR

(71) Applicant: Murata Manufacturing Co., Ltd., Nagaokakyo (JP)

(72) Inventor: Kazuhisa Uchida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/233,407

(22) Filed: Aug. 14, 2023

(65) Prior Publication Data

US 2023/0386744 A1 Nov. 30, 2023

Related U.S. Application Data

(63) Continuation of application No. 17/571,576, filed on Jan. 10, 2022, now Pat. No. 11,776,749.

(30) Foreign Application Priority Data

Jan. 26, 2021 (JP) ................................. 2021-010214

(51) Int. Cl.
  *H01G 4/12* (2006.01)
  *H01G 4/012* (2006.01)
  *H01G 4/232* (2006.01)
  *H01G 4/30* (2006.01)

(52) U.S. Cl.
  CPC ........... *H01G 4/1227* (2013.01); *H01G 4/012* (2013.01); *H01G 4/30* (2013.01); *H01G 4/2325* (2013.01)

(58) Field of Classification Search
  CPC ........ H01G 4/1227; H01G 4/012; H01G 4/30; H01G 4/2325
  See application file for complete search history.

(56) References Cited

U.S. PATENT DOCUMENTS

| | | | |
|---|---|---|---|
| 2011/0235233 A1* | 9/2011 | Ando | H01G 4/1227 361/301.4 |
| 2016/0181019 A1* | 6/2016 | Park | H01G 4/12 361/301.4 |
| 2016/0314900 A1* | 10/2016 | Sin | H01G 4/12 |
| 2017/0018363 A1* | 1/2017 | Tanaka | H01G 4/232 |
| 2017/0025222 A1* | 1/2017 | Park | H01G 4/1209 |
| 2018/0240592 A1* | 8/2018 | Morita | H01G 4/30 |

OTHER PUBLICATIONS

Uchida, "Multilayer Ceramic Capacitor", U.S. Appl. No. 17/571,576, filed Jan. 10, 2022.

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body including the dielectric ceramic layers and the internal electrode layers which are laminated, and external electrodes connected to the internal electrode layers. The multilayer body includes segregation including Si as a main component in a vicinity of an end of the internal electrode layer in a width direction. An average particle size of the dielectric particles in the vicinity of the end of the internal electrode layer in the width direction in the dielectric ceramic layer is smaller than an average particle size of a dielectric particles in a central portion of the internal electrode layer in the width direction in the dielectric ceramic layer.

14 Claims, 7 Drawing Sheets

MULTILAYER CERAMIC CAPACITOR

CROSS REFERENCE TO RELATED APPLICATIONS

This application claims the benefit of priority to Japanese Patent Application No. 2021-010214 filed on Jan. 26, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor has been known which includes a multilayer body in which dielectric ceramic layers and the internal electrode layers are stacked. In such a multilayer ceramic capacitor, it is possible to achieve high capacitance by increasing the number of laminated dielectric ceramic layers and reducing the thickness thereof.

For example, Japanese Unexamined Patent Application Publication No. 2002-305124 discloses a multilayer ceramic capacitor in which the capacitance increases by making the average particle size in the direction parallel to the internal electrode layers of the dielectric particles included in the dielectric ceramic layer larger than the dielectric ceramic layer.

In a multilayer ceramic capacitor, short circuiting is likely to occur between the internal electrode layers at their side surface.

SUMMARY OF THE INVENTION

Preferred embodiments of the present invention provide highly reliable multilayer ceramic capacitors each sufficiently reducing or preventing short circuiting between internal electrode layers.

A preferred embodiment of the present invention provides a multilayer ceramic capacitor including a multilayer body including dielectric ceramic layers and internal electrode layers laminated in a lamination direction, and external electrodes connected to the internal electrode layers, the multilayer body including a first main surface and a second main surface opposed to each other in the lamination direction, a first side surface and a second side surface opposed to each other in a width direction perpendicular or substantially perpendicular to the lamination direction, and a first end surface and a second end surface opposed to each other in a length direction perpendicular or substantially perpendicular to the lamination direction and the width direction, the multilayer body including a segregation including Si as a main component in a vicinity of an end of the internal electrode layer in the width direction, in which an average particle size of dielectric particles in the vicinity of the end of the internal electrode layer in the width direction in the dielectric ceramic layer is smaller than an average particle size of dielectric particles in a central portion of the internal electrode layer in the width direction in the dielectric ceramic layer.

According to preferred embodiments of the present invention, it is possible to provide highly reliable multilayer ceramic capacitors enabling to sufficiently reduce or prevent short circuiting between internal electrode layers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
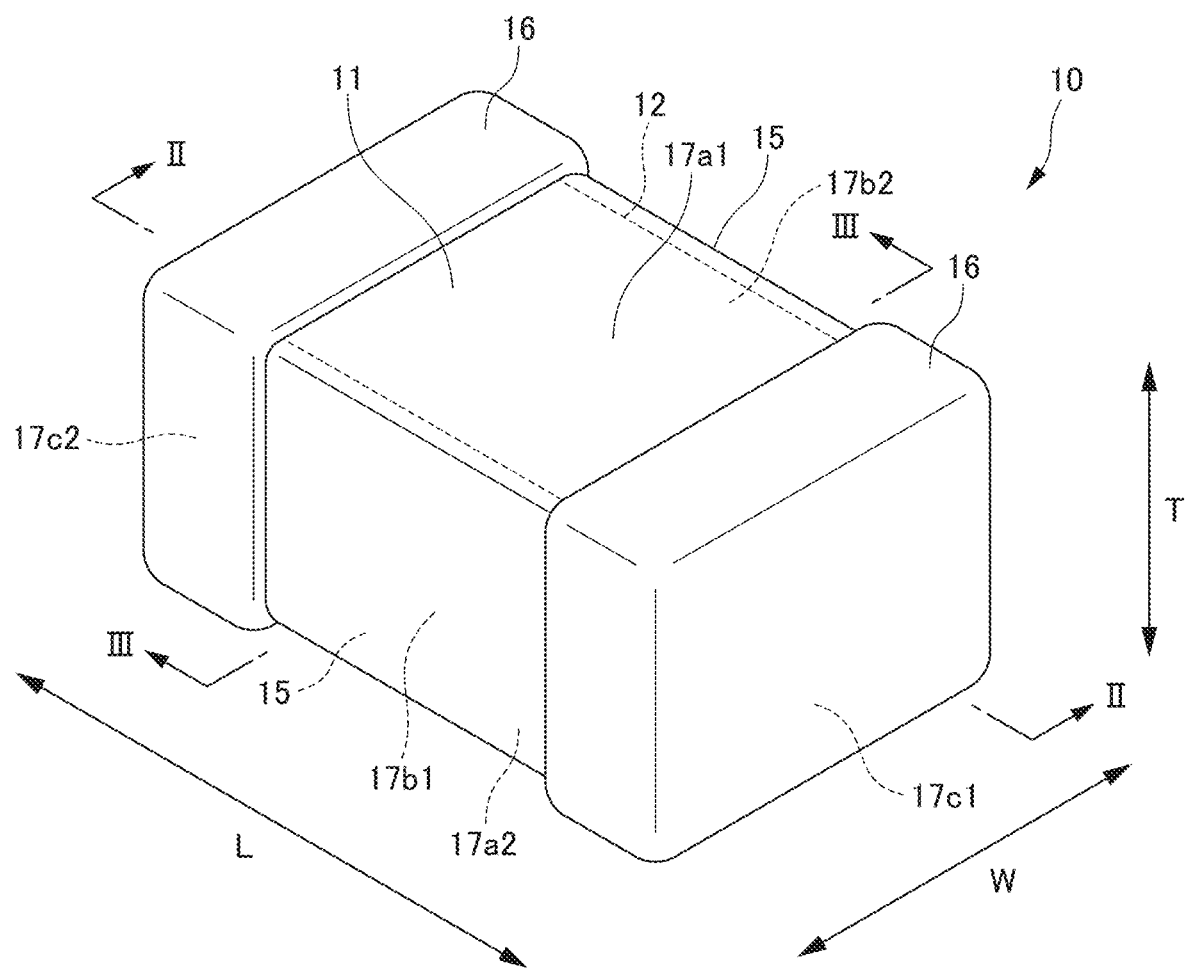
FIG. 1 is a schematic perspective view of a multilayer ceramic capacitor according to a preferred embodiment of the present invention.
Figure 2:
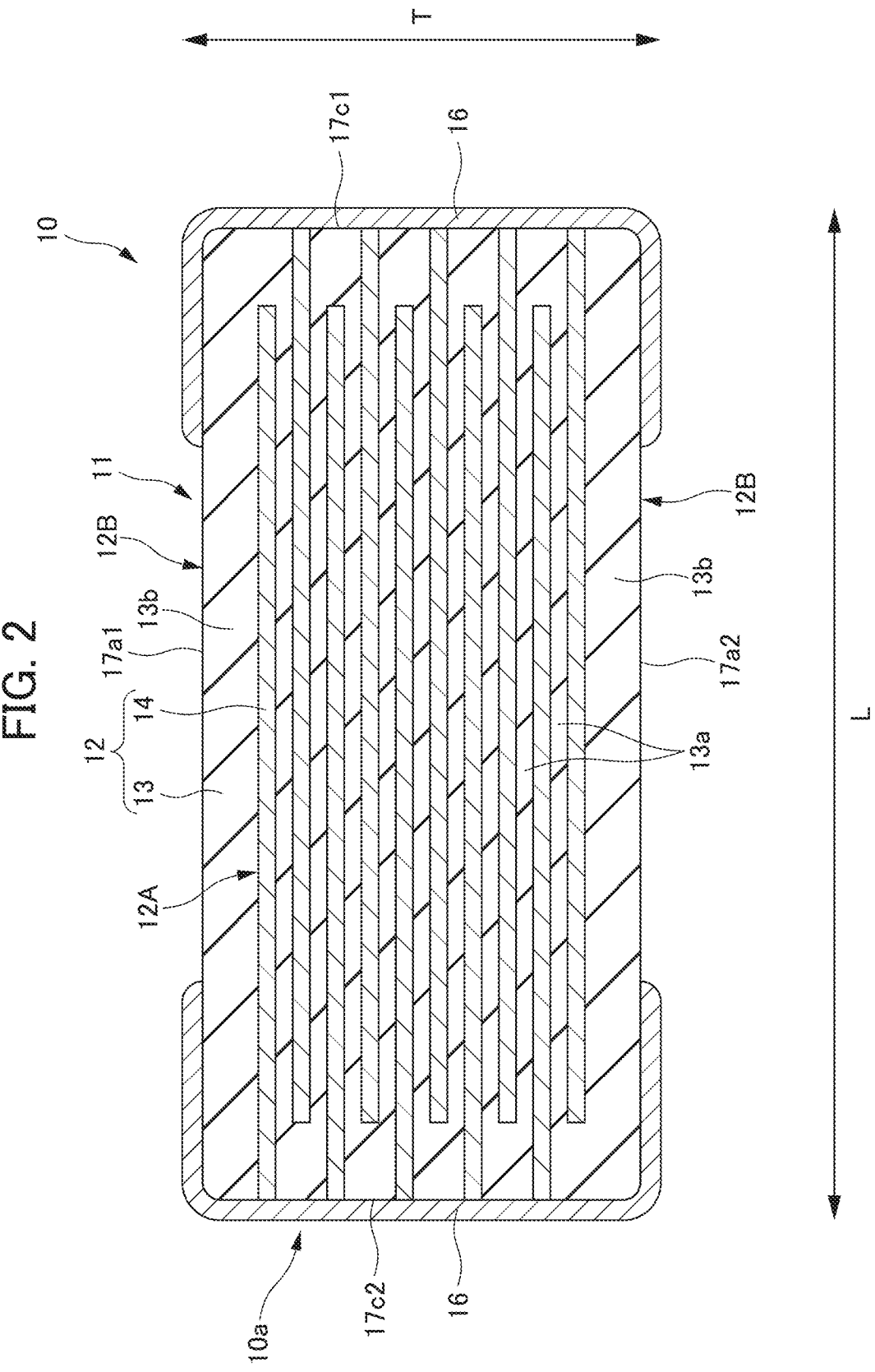
FIG. 2 is a cross-sectional view taken along the line II-II in FIG. 1.
Figure 3:
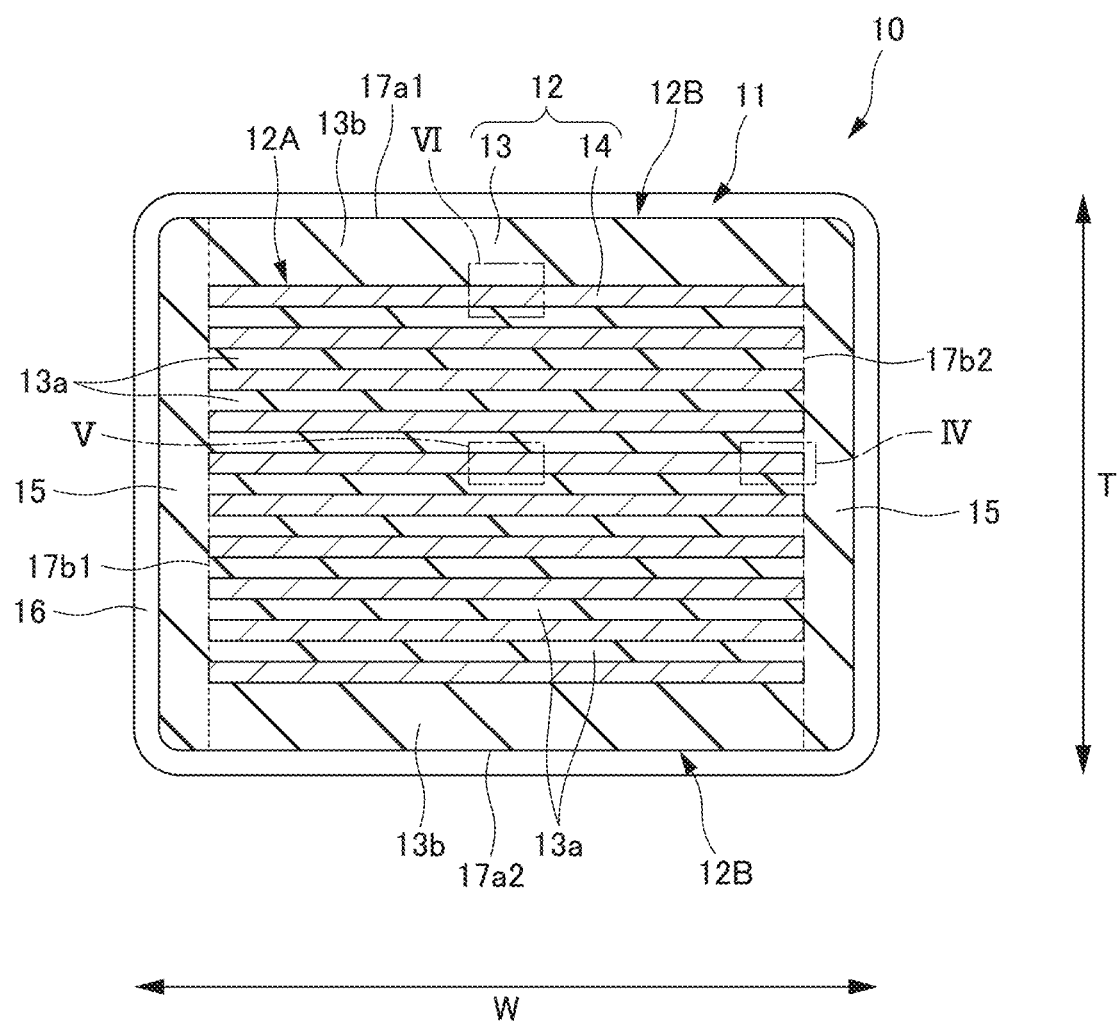
FIG. 3 is a cross-sectional view take along the line III-III in FIG. 1.

Preferred embodiments of the present invention will be described below with reference to the drawings. FIG. 1 is a schematic perspective view of a multilayer ceramic capacitor 10 according to a preferred embodiment of the present invention. FIG. 2 is a cross-sectional view taken along the line II-II shown in FIG. 1. FIG. 3 is a cross-sectional view taken along the line III-III shown in FIG. 1.

As shown in FIG. 1, the multilayer ceramic capacitor 10 of the present preferred embodiment is an electronic component having a rectangular parallelepiped or substantially rectangular parallelepiped shape. The multilayer ceramic capacitor 10 includes a base body 11, and a pair of external electrodes 16.

In FIGS. 1 to 3, the arrow T indicates the lamination (stacking) direction of the multilayer ceramic capacitor 10 and the base body 11. In FIGS. 1 and 2, the arrow L indicates a length direction perpendicular or substantially perpendicular to the lamination direction (T) of the multilayer ceramic capacitor 10 and the base body 11. In FIGS. 1 and 3, the arrow W indicates a width direction perpendicular or substantially perpendicular to the lamination direction (T) and the length direction (L) of the multilayer ceramic capacitor 10 and the base body 11. It should be noted that the lamination direction (T) and the width direction (W) are also shown in FIGS. 4 to 7.

As shown in FIGS. 1 and 2, a pair of external electrodes 16 are spaced apart from each other, and cover the outer surfaces of both ends in the length direction (L) of the base body 11. The pair of external electrodes 16 each include a conductive film.

The pair of external electrodes 16 each include a laminated film including, for example, a sintered metal layer and a plated layer. The sintered metal layer is formed by firing a paste such as, for example, Cu, Ni, Ag, Pd, Ag—Pd alloy, and Au. The plated layer includes, for example, a Ni-plated layer and a Sn-plated layer covering the Ni-plated layer. The plated layer may be, for example, a Cu-plated layer or an Au-plated layer, instead of these layers. Furthermore, the pair of external electrodes 16 may include only the plated layer. Furthermore, a conductive resin paste can be used as the pair of external electrodes 16.

As shown in FIGS. 2 and 3, the base body 11 includes a multilayer body 12 including a plurality of dielectric ceramic layers 13 and a plurality of internal electrode layers 14 stacked alternately along the lamination direction (T), and a pair of additional dielectric portions 15 covering both side surfaces of the multilayer body 12 in the width direction (W). The additional dielectric portions 15 may be referred to as side gap portions. The multilayer body 12 has the lamination direction (T), the length direction (L), and the width direction (W), which are the same as those of the multilayer ceramic capacitor 10 and the base body 11.

The dielectric ceramic layers 13 and the additional dielectric portions 15 are formed by firing a ceramic material including barium titanate as a main component, for example. The dielectric ceramic layers 13 and the additional dielectric portions 15 may be made of other high dielectric constant ceramic materials such as, for example, those mainly including $CaTiO_3$, $SrTiO_3$, $CaZrO_3$ or the like. The ceramic material included in the dielectric ceramic layers 13 and the additional dielectric portions 15 includes additives such as, for example, Si, Mg, Mn, Sn, Cu, rare earth, Ni and Al, for the purpose of adjusting the composition.

The internal electrode layers 14 are each made of a metal material such as, for example, Ni, Cu, Ag, Pd, Ag—Pd alloy, and Au. The internal electrode layers 14 may be made of other conductive materials which are not limited to these metal materials.

As shown in FIG. 2, one of the pair of internal electrode layers 14, which are adjacent to each other in the lamination direction (T) with the dielectric ceramic layer 13 interposed therebetween, is electrically connected to one of the pair of external electrodes 16 in the multilayer ceramic capacitor 10. The other one of the pair of internal electrode layers 14, which are adjacent to each other in the lamination direction (T) with the dielectric ceramic layer 13 interposed therebetween, is electrically connected to the other one of the pair of external electrodes 16 in the multilayer ceramic capacitor 10. In this way, a plurality of capacitor elements are electrically connected in parallel the pair of external electrodes 16.

As shown in FIGS. 2 and 3, the dielectric ceramic layer 13 includes a plurality of first dielectric ceramic layers 13a sandwiched between the internal electrode layers 14, and a pair of second dielectric ceramic layers 13b on both sides in the lamination direction (T) and larger in thickness than the first dielectric ceramic layers 13a. The thickness of the first dielectric ceramic layer is preferably about 0.4 μm or more and about 0.53 μm or less, for example.

As shown in FIGS. 2 and 3, the multilayer body 12 includes an inner layer portion 12A in which each of the plurality of internal electrode layers 14 are opposed with the first dielectric ceramic layer 13a interposed therebetween, and a pair of outer layer portion 12B that sandwich the inner layer portion 12A in the lamination direction (T).

Furthermore, the multilayer body 12 includes a first main surface 17a1 and a second main surface 17a2 opposed to each other in the lamination direction (T), a first side surface 17b1 and a second side surface 17b2 opposed to each other in the width direction (W), and a first end surface 17c1 and a second end surface 17c2 opposed to each other in the length direction (L).

At each of the first end surface 17c1 and the second end surface 17c2 of the multilayer body 12, end surfaces on one side in the length direction (L) of the internal electrode layers 14 to be connected to the external electrode 16 are exposed. On the other hand, at each of the first side surface 17b1 and the second side surface 17b2 of the multilayer body 12, end surfaces on both sides in the width direction (W) of the internal electrode layers 14 are exposed.

As shown in FIG. 3, at the first side surface 17b1 and the second side surface 17b2 of the multilayer body 12, the additional dielectric portions 15 are provided to cover each of the first side surface 17b1 and the second side surface 17b2.

The multilayer ceramic capacitor 10 of the present preferred embodiment is manufactured, for example, such that a material including the dielectric ceramic layers 13 and the internal electrode layers 14 is laminated to form the multilayer body 12, and a material defining and functioning as the additional dielectric portions 15 is laminated on the first side surface 17b1 and the second side surface 17b2 of the multilayer body 12. Furthermore, each material defining and functioning as the multilayer body 12 and the additional dielectric portions 15 is fired, following which the external electrodes 16 are formed by firing, plating or the like, for example, to manufacture the multilayer ceramic capacitor 10.

Figure 4:
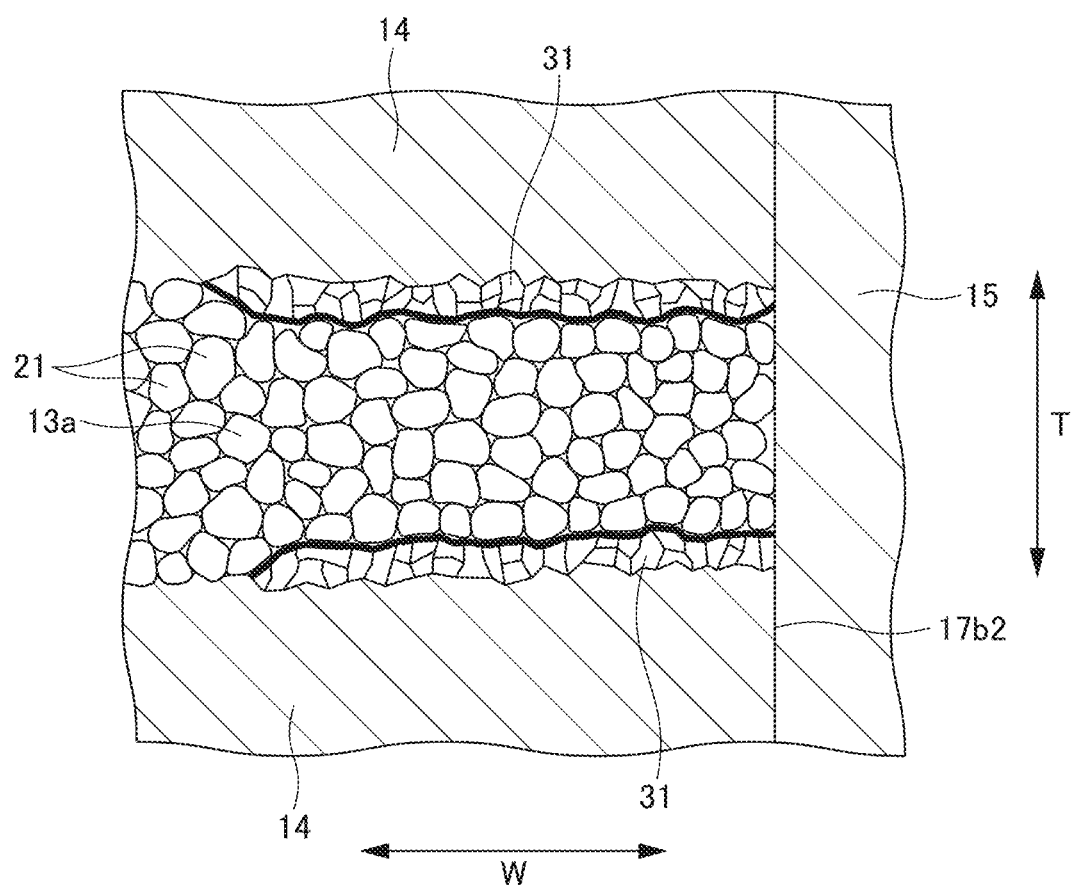
FIG. 4 is an enlarged view of a portion IV in FIG. 3.
Figure 5:
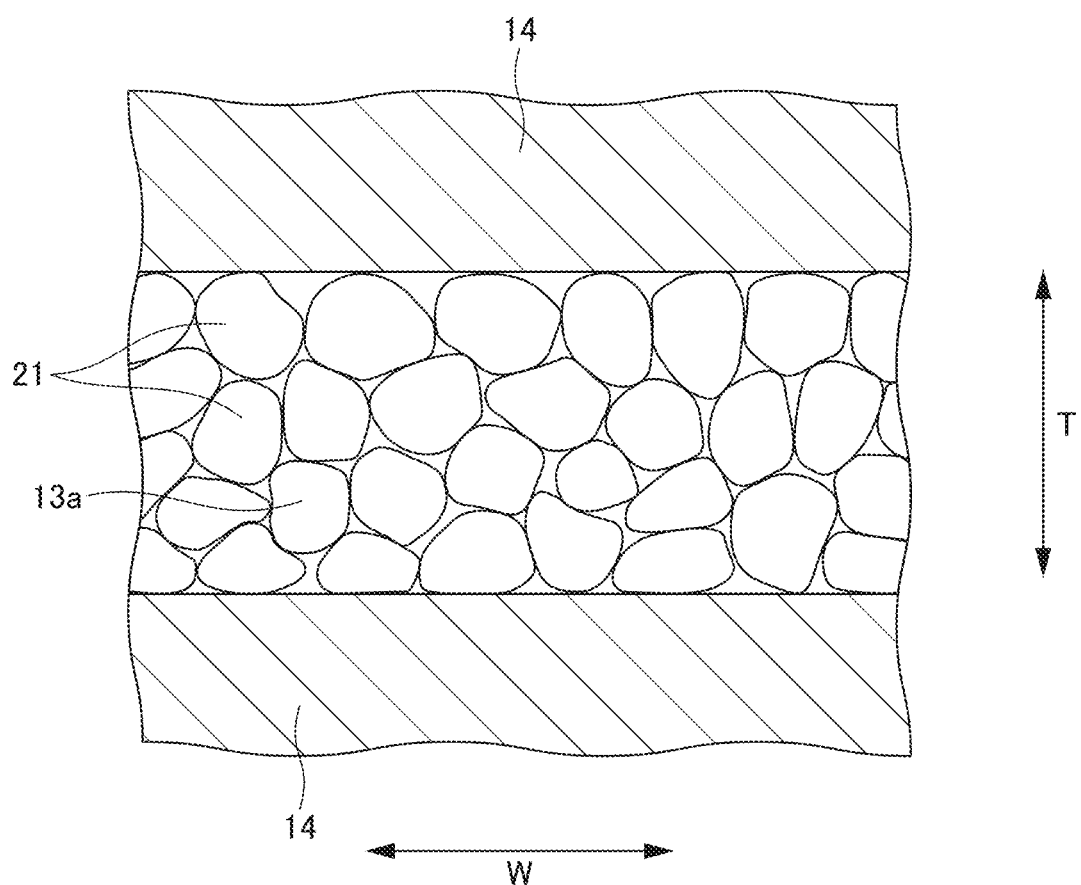
FIG. 5 is an enlarged view of a V portion in FIG. 3.

FIG. 4 is an enlarged view of a portion indicated by IV in FIG. 3, i.e., the vicinity of the end in the width direction (W) of the internal electrode layers 14. FIG. 4 shows the internal electrode layers 14, the first dielectric ceramic layer 13a provided between the internal electrode layers 14, and the additional dielectric portions 15 in contact with the internal electrode layers 14 and the second side surface 17b2 of the dielectric ceramic layer 13a. FIG. 5 is an enlarged portion indicated by V in FIG. 3, i.e., an enlarged view in the central portion in the width direction (W) of the internal electrode layer 14. FIG. 5 shows the internal electrode layers 14, and the first dielectric ceramic layer 13a provided between the internal electrode layers 14. The first dielectric ceramic layer 13a includes dielectric particles 21 derived from the material of the first dielectric ceramic layer 13a.

In the present preferred embodiment, as shown in FIG. 4, silica 31 mainly including Si is segregated on the interface with the first dielectric ceramic layer 13a in the vicinity of the end in the width direction (W) of the internal electrode layers 14. Silica 31 is one of the elements included in the first dielectric ceramic layer 13a, and is defined by $SiO_2$ derived from Si of the additive. The segregation of the silica 31 is caused by Si included in the first dielectric ceramic layer 13a migrating onto the internal electrode layer 14 during firing of the first dielectric ceramic layer 13a. In the present disclosure, a vicinity indicates a region within about 35 μm from the end in the width direction (W) of the internal electrode layer 14.

Although not shown, on the opposite side in the width direction (W) of the internal electrode layer 14 shown in FIG. 4, i.e., even in the vicinity of the first side surface 17b1, silica 31 is also segregated in the same or substantially the same manner as in FIG. 4 at the interface with the first dielectric ceramic layer 13a in the vicinity of the end in the width direction (W) of the internal electrode layers 14. Silica 31 may be segregated not only at the interface between the internal electrode layers 14 and the first dielectric ceramic layer 13a, but also at the interface between the internal electrode layers 14 and the additional dielectric portion 15 in the width direction (W).

Furthermore, as is evident by comparing FIG. 4 with 5, in the first dielectric ceramic layer 13a, the average particle size of the dielectric particles 21 in the vicinity of the end in the width direction (W) of the internal electrode layer 14 is smaller than the average particle size of the dielectric particles 21 in the central portion in the width direction (W) of the internal electrode layers 14. In the present specification, the average particle size indicates a circular equivalent particle size having an integrated number distribution of about 50% when image analysis is performed by a scanning electron microscope (SEM) in a predetermined region.

In the present preferred embodiment, the average particle size of the dielectric particles 21 of the first dielectric ceramic layer 13a present in the central portion in the width direction (W) of the internal electrode layers 14 is, for example, preferably about 1.9 times or more and about 2.6 times or less, more preferably about 1.9 times or more and about 2.3 times or less, the average particle size of the dielectric particles 21 of the first dielectric ceramic layer 13a present in the vicinity of the end in the width direction (W) of the internal electrode layers 14.

Alternatively, the ratio of the dimension in the width direction of the dielectric particles 21 of the first dielectric ceramic layer 13a in the vicinity of the end in the width direction (W) of the internal electrode layers 14 to the dimension in the width direction of the dielectric particles 21 of the first dielectric ceramic layer 13a in the central portion in the width direction (W) of the internal electrode layers 14 may be, for example, about 1:8 to about 1:63.

Furthermore, in the present preferred embodiment, the number of the dielectric particles 21 of the first dielectric ceramic layers 13a in the vicinity of the end in the width direction (W) of the internal electrode layers 14 is, for example, about 2.0 times or more and about 2.5 times or less, more preferably about 2.0 times or more and about 2.2 times or less, the number of the dielectric particles 21 of the first dielectric ceramic layers 13a present in the central portion in the width direction of the internal electrode layers 14.

Figure 6:
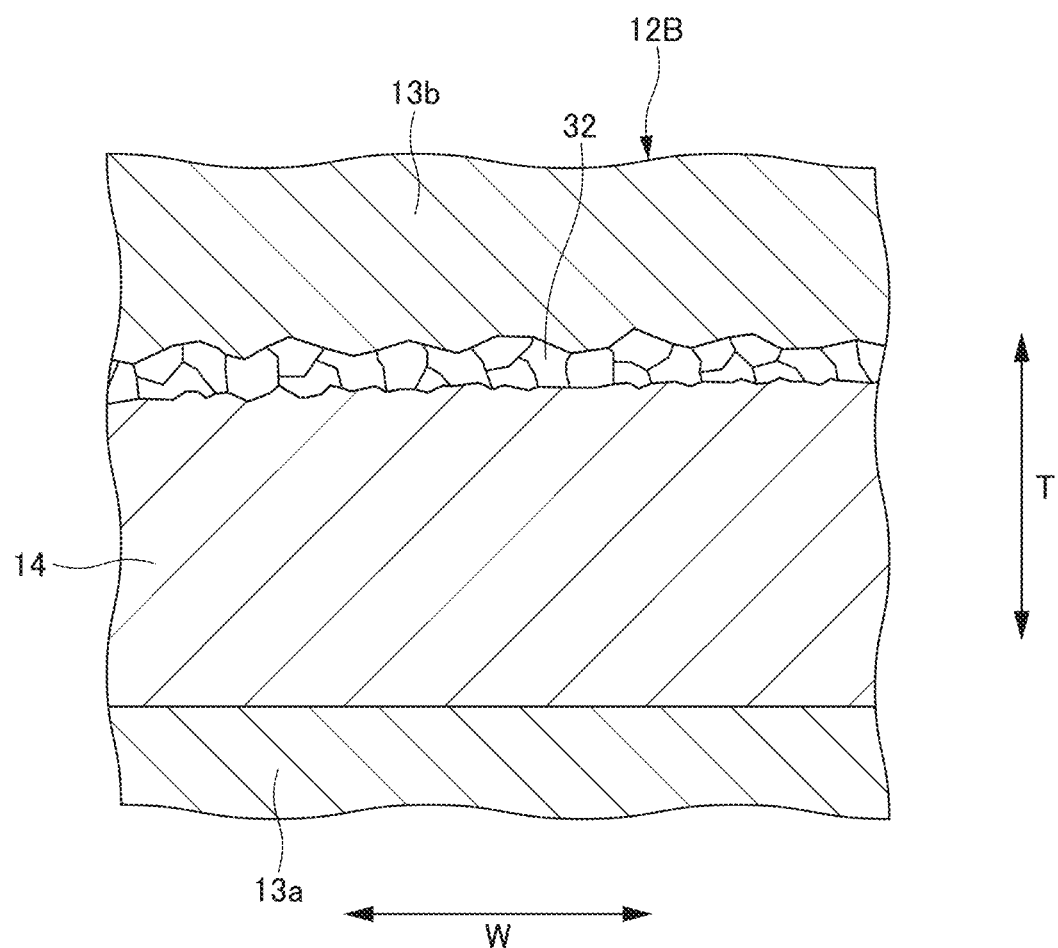
FIG. 6 is an enlarged view of a portion VI in FIG. 3.

As shown in FIG. 6, the present preferred embodiment includes a structure in which silica 32 is segregated in the vicinity of the internal electrode layer 14 in the second dielectric ceramic layers 13b included in the outer layer portion 12B. Although the outer layer portions 12B are provided at both ends in the lamination direction (T) of the inner layer portion 12A, silica 32 may be segregated in the vicinity of the internal electrode layer 14 in the second dielectric ceramic layer 13b at least in one or both of the outer layer portions 12B.

Figure 7:
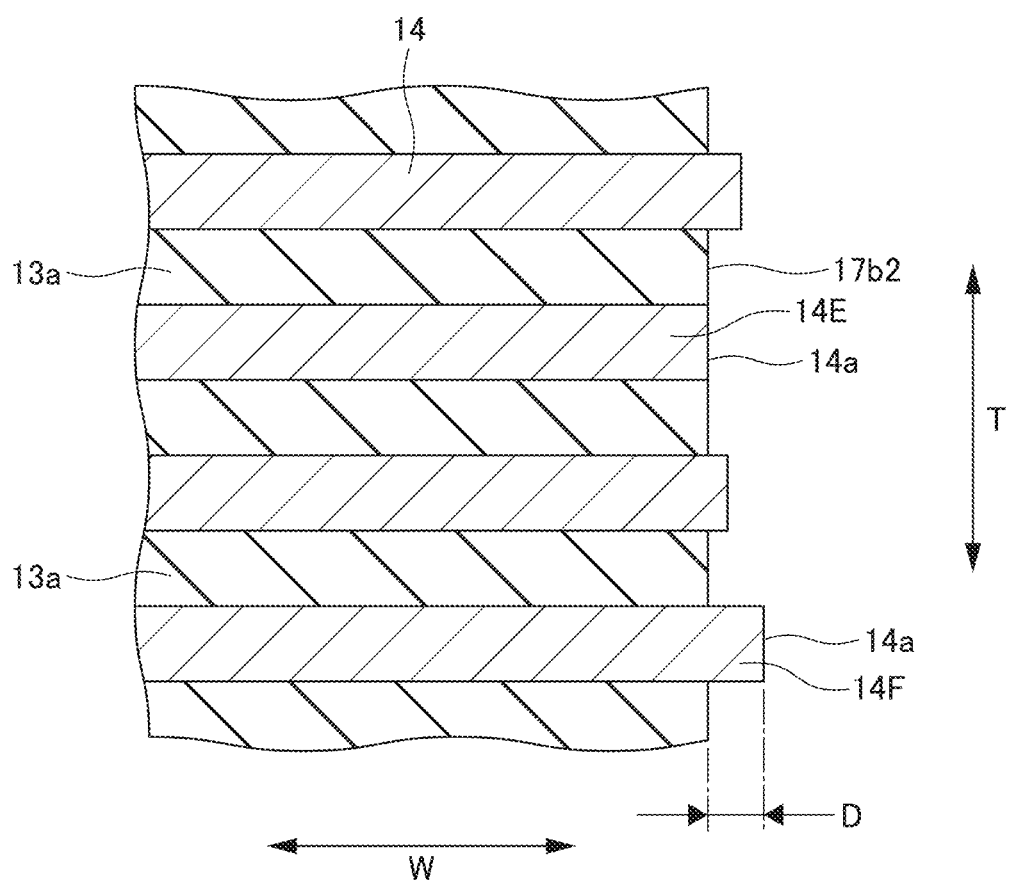
FIG. 7 is a cross-sectional view showing an amount of deviation at the side surface of internal electrode layers of a multilayer body including dielectric ceramic layers according to a preferred embodiment of the present invention.

In the present preferred embodiment, as shown in FIG. 7, the maximum deviation amount in the width direction (W) of edges 14a of all the internal electrode layers 14 defining the second side surface 17b2 of the multilayer body 12 is, for example, preferably about 5 μm or less, and more preferably about 0.5 μm or less. The same applies to the first side surface 17b1 of the multilayer body 12, and the maximum deviation amount in the width direction (W) of the edges of the internal electrode layers 14 may be, for example, about 0.5 μm or less.

The maximum deviation amount referred to herein is a difference D in the width direction (W) between the inner most edge 14a (14E in FIG. 7) in the width direction (W) of the internal electrode layer 14, and the outer most edge 14a (14F in FIG. 7) in the width direction (W) of the internal electrode layer 14.

The multilayer ceramic capacitor 10 according to the present preferred embodiment described above provides the following advantageous effects.

(1) The multilayer ceramic capacitor 10 according to the present preferred embodiment includes the multilayer body 12 including the dielectric ceramic layers 13 and the internal electrode layers 14 laminated in the lamination direction (T), and the external electrodes 16 connected to the internal electrode layers 14. The multilayer body 12 includes the first main surface 17a1 and the second main surface 17a2 opposed to each other in the lamination direction (T), the first side surface 17b1 and the second side surface 17b2 opposed to each other in the width direction (W) which is perpendicular or substantially perpendicular to the lamination direction (T), and the first end surface 17c1 and the second end surface 17c2 opposed to each other in the length direction (L) which is perpendicular or substantially perpendicular to the lamination direction (L) and the width direction (W). The multilayer body 12 includes a segregation of silica 31 mainly including Si in the vicinity of an end of the internal electrode layer 14 in the width direction (W). The average particle size of the dielectric particles 21 in the vicinity of the end of the internal electrode layer 14 in the width direction (W) in the dielectric ceramic layer 13 is smaller than the average particle size of the dielectric particles 21 in a central portion of the internal electrode layer 14 in the width direction (W) in the dielectric ceramic layer 13.

As a result, at the end in the width direction (W) of the internal electrode layer 14 where silica 31 is segregated, the advantageous effect of reducing or preventing the penetration of moisture by the silica 31 is obtained, such that short-circuiting between the internal electrode layers 14 is sufficiently reduced or prevented to ensure high reliability. Furthermore, the surface area of the entire dielectric particles 21 in the vicinity of the end in the width direction (W) of the internal electrode layer 14 increases. Therefore, the area of silica 31 segregated at the interface defining and functioning as the surface area increases. As a result, the advantageous effect of reducing or preventing the penetration of moisture by the silica 31 is remarkably obtained, such that short-circuiting between the internal electrode layers 14 is sufficiently reduced or prevented to ensure higher reliability.

(2) In the multilayer ceramic capacitor 10 according to the present preferred embodiment, the average particle size of the dielectric particles 21 in the central portion of the internal electrode layer 14 in the width direction (W) in the dielectric ceramic layer 13 is preferably, for example, about 1.9 times or more and about 2.6 times or less the average particle size of the dielectric particles 21 in the vicinity of the end of the internal electrode layer 14 in the width direction (W) in the dielectric ceramic layer 13.

With such a configuration, a state is ensured in which the average particle size of the dielectric particles 21 at the central portion in the width direction (W) is larger than the average particle size of the dielectric particles 21 at the end in the width direction (W), such that high capacitance is achieved.

(3) In the multilayer ceramic capacitor 10 according to the present preferred embodiment, the number of the dielectric particles 21 present in the vicinity of the end of the internal electrode layer 14 in the width direction (W) in the dielectric ceramic layer 13 is preferably, for example, about 2.0 times or more and about 2.5 times or less the number of the dielectric particles 21 present in the central portion of the internal electrode layer 14 in the width direction (W) in the dielectric ceramic layer 13.

With such a configuration, the overall surface area of the dielectric particles 21 in the vicinity of the end in the width direction (W) of the internal electrode layer 14 increases. Therefore, the area of silica 31 segregated at the interface defining and functioning as the surface area increases. As a result, the advantageous effect of reducing or preventing the penetration of moisture by silica 31 is remarkably obtained, such that short-circuiting between the internal electrode layers 14 is sufficiently reduced or prevented to ensure higher reliability.

(4) The multilayer ceramic capacitor 10 according to the present preferred embodiment may further include the outer layer portions 12B, each including dielectric ceramic in contact with the internal electrode layers 14 on both sides of the multilayer body 12 in the lamination direction (T), in which silica 32 may be segregated in the vicinity of the internal electrode layer 14 in each of the outer layer portions 12B.

With such a configuration, the advantageous effect is ensured of reducing or preventing the penetration of moisture by silica 32 segregated at the interface between the internal electrode layer 14 of the end in the lamination direction (T) of the inner layer portion 12A, and the dielectric ceramic layer 13b of the outer layer portion 12B, such that high reliability.

(5) In the multilayer ceramic capacitor 10 according to the present preferred embodiment, the first dielectric ceramic layers 13a, each provided between the internal electrode layers 14 preferably, for example, have a thickness of about 0.4 µm or more and about 0.53 µm or less.

When the thickness of the first dielectric ceramic layer 13a provided between the internal electrode layers 14 is about 0.4 µm or less, there is a possibility that the insulating resistance cannot be maintained, such that the reliability is reduced. On the other hand, when the thickness is about 0.53 µm or more, it is difficult to provide sufficient capacitance. Therefore, when the thickness of the first dielectric ceramic layer 13a provided between the internal electrode layers 14 is about 0.4 µm or more and about 0.53 µm or less, reliability and capacitance are ensured.

(6) In the multilayer ceramic capacitor 10 according to the present preferred embodiment, the maximum deviation amount in the width direction (W) of the edge 14a in the width direction (W) of the internal electrode layers 14 constituting the first side surface 17b1 and the second side surface 17b2 of the multilayer body 12 is, for example, about 5 µm or less.

With such a configuration, the first side surface 17b1 and the second side surface 17b2 of the multilayer body 12 become flat. When the additional dielectric portions 15 are attached to the first side surface 17b1 and the second side surface 17b2, it is possible to provide in a flat state without irregularity by attaching the additional dielectric portions 15 to the first side surface 17b1 and the second side surface 17b2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including dielectric ceramic layers and internal electrode layers laminated in a lamination direction; and
external electrodes connected to the internal electrode layers; wherein
the multilayer body includes a first main surface and a second main surface opposed to each other in the lamination direction, a first side surface and a second side surface opposed to each other in a width direction perpendicular or substantially perpendicular to the lamination direction, and a first end surface and a second end surface opposed to each other in a length direction perpendicular or substantially perpendicular to the lamination direction and the width direction; and
the multilayer body includes a segregation including Si as a main component in an interface between at least one of the internal electrode layers and at least one of the dielectric ceramic layers in a region within about 35 µm from an end in the width direction of the at least one of the internal electrode layers and the at least one of the dielectric ceramic layers.

2. The multilayer ceramic capacitor according to claim 1, wherein an average particle size of dielectric particles of the dielectric ceramic layer between regions of the end of the internal electrode layers in a vicinity in the lamination direction is smaller than the average particle size of the dielectric particles of the dielectric ceramic layer between central portions of the internal electrode layers in the vicinity in the lamination direction.

3. The multilayer ceramic capacitor according to claim 1, wherein an average particle size of dielectric particles in a central portion of the internal electrode layer in the width direction in the dielectric ceramic layer is about 1.9 times or more and about 2.6 times or less the average particle size of the dielectric particles in a vicinity of the end of the internal electrode layer in the width direction in the dielectric ceramic layer.

4. The multilayer ceramic capacitor according to claim 1, wherein a number of dielectric particles in a vicinity of the end of the internal electrode layer in the width direction in the dielectric ceramic layer is about 2.0 times or more and about 2.5 times or less a number of the dielectric particles in a central portion of the internal electrode layer in the width direction in the dielectric ceramic layer.

5. The multilayer ceramic capacitor according to claim 1, further comprising:
outer layer portions, each including a dielectric ceramic in contact with the internal electrode layers on both sides of the multilayer body in the lamination direction; wherein
silica is segregated in a vicinity of the internal electrode layer in each of the outer layer portions.

6. The multilayer ceramic capacitor according to claim 1, wherein the dielectric ceramic layers, each provided between the internal electrode layers, have a thickness of about 0.4 µm or more and about 0.53 µm or less.

7. The multilayer ceramic capacitor according to claim 1, wherein a maximum deviation amount in the width direction of an edge in the width direction of the internal electrode layers defining the first side surface and the second side surface of the multilayer body is about 5 µm or less.

8. The multilayer ceramic capacitor according to claim 1, wherein an average particle size of dielectric particles in a central portion of the internal electrode layer in the width direction in the dielectric ceramic layer is about 1.9 times or more and about 2.3 times or less than the average particle size of the dielectric particles in a vicinity of the end of the internal electrode layer in the width direction in the dielectric ceramic layer.

9. The multilayer ceramic capacitor according to claim 1, wherein a number of dielectric particles in a vicinity of the end of the internal electrode layer in the width direction in the dielectric ceramic layer is about 2.0 times or more and about 2.2 times or less than a number of the dielectric particles in the central portion of the internal electrode layer in the width direction in the dielectric ceramic layer.

10. The multilayer ceramic capacitor according to claim 1, wherein each of the external electrodes includes a laminated film including a sintered metal layer and a plated layer.

11. The multilayer ceramic capacitor according to claim 10, wherein the sintered metal layer includes a fired paste including at least one of Cu, Ni, Ag, Pd, Ag—Pd alloy, or Au.

12. The multilayer ceramic capacitor according to claim 10, wherein the plated layer includes a Ni-plated layer and a Sn-plated layer covering the Ni-plated layer.

13. The multilayer ceramic capacitor according to claim 1, wherein each of the dielectric ceramic layers includes barium titanate as a main component.

14. The multilayer ceramic capacitor according to claim 13, wherein the dielectric ceramic layers include at least one of Si, Mg, Mn, Sn, Cu, rare earth, or Ni and Al as an additive.

* * * * *